United States Patent [19]

Holland

[11] Patent Number: 4,847,444

[45] Date of Patent: Jul. 11, 1989

[54] ELECTRIC OUTLET BOX HOLDER

[75] Inventor: Dawson Holland, Louisville, Ky.

[73] Assignee: Ideation, Inc., Louisville, Ky.

[21] Appl. No.: 255,279

[22] Filed: Oct. 11, 1988

[51] Int. Cl.$^4$ .............................................. H02G 3/12
[52] U.S. Cl. ...................................... 174/58; 220/3.6; 248/DIG. 6
[58] Field of Search ..................... 174/58; 220/3.5, 3.6; 248/27.1, DIG. 6

[56] References Cited

U.S. PATENT DOCUMENTS

| | | | |
|---|---|---|---|
| 2,842,281 | 7/1958 | Chisholm | 220/3.6 |
| 3,268,189 | 8/1966 | Ducharme | 248/27.1 |
| 3,362,667 | 1/1968 | Ginsburg | 248/27.1 |
| 3,468,448 | 9/1969 | McHollan et al. | 220/3.6 |
| 3,963,204 | 6/1976 | Liss | 174/58 X |

Primary Examiner—A. T. Grimley
Assistant Examiner—David A. Tone
Attorney, Agent, or Firm—Scott R. Cox

[57] ABSTRACT

Provided herein is a snap-in outlet box holder to allow for the quick, easy installation of an outlet box in a wallboard, paneling or other similarly finished wall covering without the necessity of securing the outlet box to an existing stud. The invention provided is a generally C-shaped, structure with a flexible back and two flexible arms, wherein each arm is grooved to provide a grooved opening which will fit around the wall to hold the outlet box holder securely in place.

In addition, there is also provided spacer blocks which will fit over the inside lip of the groove of the outlet box and which provide a method to secure the outlet box holder to various thicknesses of wallboard, paneling and other similarly finished walls. This product will make installation of an outlet box to an existing wall quite simple and quick.

8 Claims, 3 Drawing Sheets

ELECTRIC OUTLET BOX HOLDER

BACKGROUND OF INVENTION

1. Field of Invention

This invention relates to outlet box installation equipment. In particular, this invention relates to a snap-in, outlet box holder for use in installing outlet boxes in existing walls.

2. Prior Art

In the construction of residential and commercial buildings cable is usually run along the side of and through studs and joists in the walls and floor of the buildings. After the walls are secured to the joists and studs, the cable is frequently run under a floor, behind a baseboard or between the studs and joists.

After the construction of the walls is complete, owners of the building frequently wish to install additional electrical receptacles, telephone plugs or cable TV outlets. In the past the securing of these outlet boxes to already existing wall has been difficult. To secure a new outlet box, the cable is first run behind the wall, and then pulled into an opening which has been cut in that wall for the installation of the outlet box. The outlet box is then fit into the opening and secured against the wallboard by use of brackets, toggles or flanges. In some devices the outlet box can only be installed if it is placed against the studs of the wall, so that it can be nailed or screwed into the existing studs. However, this method of installation is not always acceptable since the placement of a new outlet box is frequently determined more by function or desire than by the location of existing wall joists. Thus, an easy method for installing such outlet boxes is necessary. Current products on the market for installing outlets in existing walls require cumbersome brackets, toggle boxes or flange boxes which are difficult to install for the layman, expensive to produce and are frequently unstable after installation.

Therefore, it is an object of this invention to provide a snap-in outlet box holder for the quick installation of an outlet box in an existing wallboard, paneling or other similarly finished wall cover.

It is another object of this invention to provide a snap-in outlet box holder which is easy to install.

It is a still further object of this invention to provide a snap-in outlet box holder which is safe, reliable and effective in securely attaching an outlet box to an existing wall.

These and other objects and features of the present invention will become apparent to those skilled in the art from a consideration of the following detailed description, drawings and claims. The description along with the accompanying drawings provides a selected example of construction of the device to illustrate the invention.

SUMMARY OF INVENTION

In accordance with the present invention there is provided a snap-in outlet box holder comprising a generally C-shaped, structure with a flexible back and a first and second arm, each arm generally perpendicular to the back, wherein each arm is grooved and wherein the back and each arm has a plurality of knockout openings.

This snap-in outlet box holder provides a quick, efficient, inexpensive method for installing outlet boxes to a conventional wallboard, paneling or other similarly finished wall covering without the need of securing the box to an existing wall stud.

BRIEF DESCRIPTION OF THE DRAWINGS

This invention will now be described with reference to the accompanying drawings in which.

DETAILED DESCRIPTION OF PREFERRED EMBODIMENT

Figure 1:
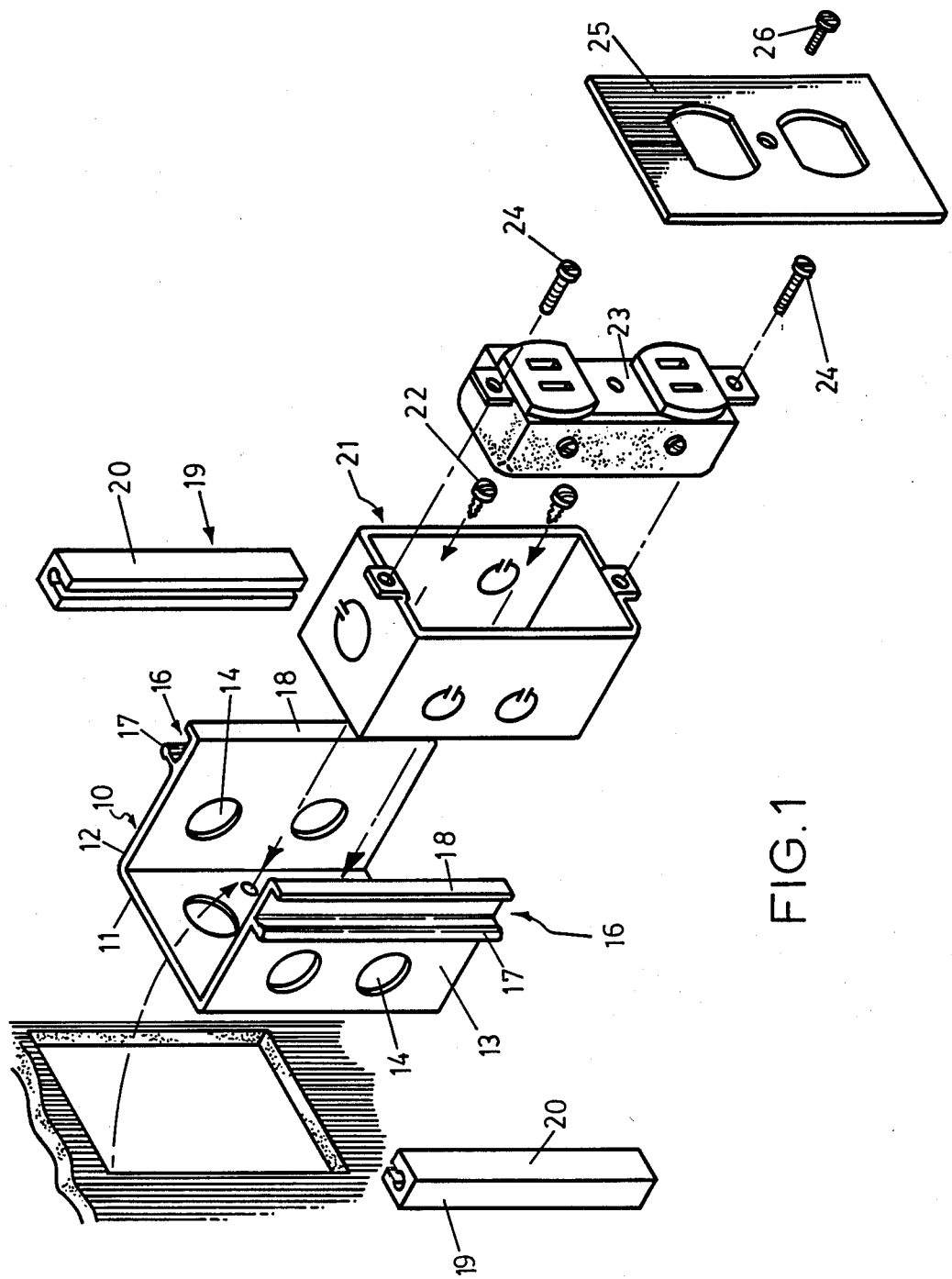
FIG. 1 is an exploded view of the snap-in outlet box holder with an electric outlet box receptacle and coverplate.

Although the invention is adaptable to a wide variety of uses, it is shown in the drawings for the purposes of illustration as embodied in a snap-in outlet box holder (10) for use in the installation of an outlet in existing wallboard, paneling or other similarly fashioned finished wall covering comprised of a generally C-shaped structure with a flexible back (11) and a first (12) and second (13) flexible arm, each arm generally perpendicular to the back. See FIG. 1. The outlet box holder is constructed of any flexible plastic or metal or metal alloy material which meets the minimum code requirements for electrical fixtures. It is preferably constructed from flexible plastic or aluminum. It is critical that the snap-in outlet box holder be constructed of a flexible material since this flexibility is critical to its installation and ultimate stability after installation.

The snap-in outlet box holder is slightly larger in size than a conventional electric outlet box (21), so that the conventional outlet box will fit within the opening created by the arms and back of the snap-in outlet box holder.

Both the sides and back of the outlet box holder contain knockout openings (14) which can match up with openings in the electric outlet box to allow the cable, be it electric, telephonic or television cable, to pass through the knockout openings for connection with the outlet box itself.

Figure 2:
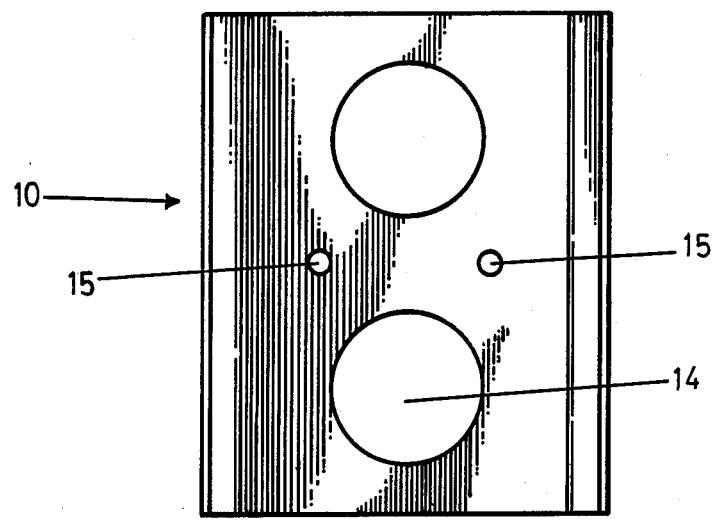
FIG. 2 is a front view of the snap-in outlet box holder.
Figure 3:
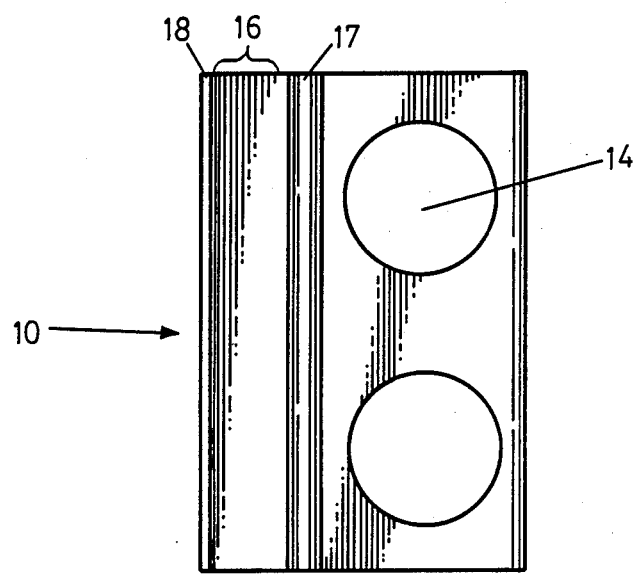
FIG. 3 is a side view of the snap-in outlet box holder.

In addition, for purposes of securing the outlet box within the outlet box holder, additional openings (15) are provided in the back of the snap-in outlet box holder for receiving screws (22) or other securing means which pass through the outlet box to safely and securely fasten the outlet box to the snap-in outlet box holder. This accomplishes stability in the entire fixture. See FIGS. 2 and 3.

Figure 4:
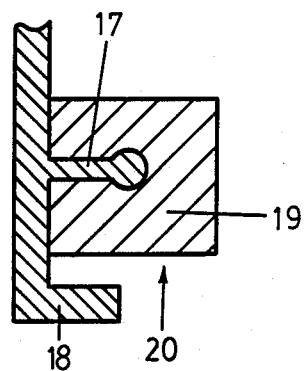
FIG. 4 is an sectional view of a portion of the snap-in outlet box holder with a spacer.

To make the snap-in outlet box more useful for installation in all thicknesses of wall covering, each arm of the snap-in outlet box holder is provided with a groove (16). See FIG. 4. These grooves run the entire height of each side of the snap-in outlet box holder. These grooves are preferably created by crimping outwardly each side of the outlet box holder to form a crimped edge (17) and, in addition, bending the end of each arm of the outlet box holder outward away from the holder to form the outer lip (18) of the groove. See FIG. 4. The thickness of the groove is preferably designed to be the thickness of a conventional wall board, whether it is ¼ inch, ½ inch, TM inch or any other conventional thickness.

In an alternative embodiment spacer blocks (19) can be designed to fit over the crimped edges of the groove. See FIG. 4. These spacer blocks are preferably designed when combined with the lip (18) of each arm to provide a well-defined distance between the outer edge (20) of the spacer block and the lip of the groove. When the outlet box holder groove is of a conventional thickness, such as ⅜ of an inch, the spacer block can be designed to fit over the crimped edge of the groove to provide, for example, an opening of ½ of an inch or ¼ of an inch, corresponding to certain standard sizes for wallboard or paneling. These spacer blocks are constructed by cutting a slit (21) into the length of the spacer block of sufficient size to fit over the crimped edge of the groove of the outlet box holder. The spacer blocks can be constructed with a plurality of slits to provide for openings of any convenient size from about ⅛ of an inch to about ⅜ of an inch. The spacer blocks (19) can be manufactured from wood, plastic or any inexpensive product that will reliably maintain a consistent space between the lip of the outlet box holder and the spacer block. The spacer block can be designed to slip on, clip on or snap over the crimped edge to provide a consistent space.

In operation, the snap-in outlet box holder (10) is designed to be used primarily when outlet boxes (21) are to be added to an already constructed wall. To install the snap-in outlet box holder, a location is determined for its installation on an existing wall, the space is measured and a tracing is made on the wall. The wallboard or other finished wall covering is then cut to fit the snap-in outlet box holder. The cables or electric lines are then run through the knockout openings (14) in the back (11) or sides (12,13) of the snap-in outlet box holder. The appropriate spacer block (19) is chosen (if a block is used), and then placed over the crimped edge (17) of the groove (16). The outlet box holder is then pushed into the opening with the arms compressed until the crimped edge of the groove passes over the wall cover. The sides are then released and allowed to snap out so that the groove fits securely within the opening cut in the wall. An appropriately chosen outlet box (21) is then secured to the snap-in outlet box holder by screws (22) running through the back of the outlet box into openings (15) provided in the snap-in outlet box holder. The cable is attached to an appropriate receptacle (23) with the receptacle secured conventionally to the outlet box (21) by receptacle screws (24). A coverplate (25) is then secured to the outlet box by a coverplate screw (26).

This new snap-in outlet box holder has great utility in the installation of an outlet box, such as an electric outlet, in wallboard, paneling, or other similarly finished wall covering without the necessity of securing the box to an existing wall stud. The device is easy to install, inexpensive to produce and quite reliable and stable. Its advantages over currently existing devices for installing new outlet boxes are quite apparent.

I claim:

1. A snap-in outlet box holder comprising a generally C-shaped structure with a flexible back and a first and second flexible arm, each arm generally perpendicular to the back, wherein each arm is grooved and wherein the back and each arm have a plurality of knockout openings.

2. The snap-in outlet box holder of claim 1 wherein the C-shaped holder has openings for receiving screws or other securing means for securing a conventional outlet box.

3. The snap-in outlet box holder of claim 1 manufactured from flexible plastic, metal or metal alloy or other flexible material.

4. The snap-in outlet box holder of claim 1 adaptable for use to hold an electric outlet, an outlet for a telephone plug or an outlet for a cable TV hookup.

5. A snap-in outlet box holder comprising:
    (a) a generally C-shaped structure with a flexible back and a first and second flexible arm, each arm generally perpendicular to the back, wherein each arm is grooved with an inside and outside edge of the groove and wherein the back and each arm have a plurality of knockout openings; and
    (b) a pair of spacer bars which fit over the inside edge of each grooved side of the holder.

6. The snap-in outlet box holder of claim 5 wherein the C-shaped holder has openings for receiving screws or other securing means for securing a conventional outlet box.

7. The snap-in outlet box holder of claim 5 manufactured from flexible plastic, metal or metal alloy material.

8. The snap-in outlet box holder of claim 5 adaptable for use to hold an electric outlet, an outlet for a telephone plug or an outlet for a cable TV hookup.

* * * * *